United States Patent
Gisbert et al.

(10) Patent No.: US 11,886,332 B2
(45) Date of Patent: Jan. 30, 2024

(54) DYNAMIC MEMORY ALLOCATION METHODS AND SYSTEMS

(71) Applicants: University of the West of Scotland, Paisley (GB); Universitat Politecnica de Valencia, Valencia (ES)

(72) Inventors: Hector Marco Gisbert, Paisley (GB); Jose Ismael Ripoll Ripoll, Valencia (ES)

(73) Assignees: UNIVERSITAT POLITECNICA DE VALENCIA, Valencia (ES); CYBER INTELLIGENCE S.L., Valencia (ES)

( * ) Notice: Subject to any disclaimer, the term of this patent is extended or adjusted under 35 U.S.C. 154(b) by 258 days.

(21) Appl. No.: 17/452,833

(22) Filed: Oct. 29, 2021

(65) Prior Publication Data
US 2022/0137841 A1    May 5, 2022

Related U.S. Application Data

(60) Provisional application No. 63/107,745, filed on Oct. 30, 2020.

(51) Int. Cl.
G06F 12/02    (2006.01)
G06F 3/06    (2006.01)
G06F 8/41    (2018.01)

(52) U.S. Cl.
CPC ............ *G06F 12/023* (2013.01); *G06F 3/064* (2013.01); *G06F 3/0631* (2013.01);
(Continued)

(58) Field of Classification Search
CPC ...... G06F 3/0631; G06F 3/0604; G06F 3/064; G06F 3/0659; G06F 3/0673; G06F 8/434;
(Continued)

(56) References Cited

U.S. PATENT DOCUMENTS 9,117,094 B2    8/2015    Anckaert et al.
9,396,030 B2    7/2016    Kuang et al.
(Continued)

FOREIGN PATENT DOCUMENTS

WO    WO-2008/008401 A2    1/2008

OTHER PUBLICATIONS

Xie, Tianyi, et al., New Exploit Methods against Ptmalloc of GLIBC, IEEE TrustCom/BigDataSE/ISPA, 2016, 8 pages, [retrieved on Sep. 1, 2023], Retrieved from the Internet: <URL:http://ieeexplore.ieee.org/>.*

(Continued)

*Primary Examiner* — Geoffrey R St Leger
(74) *Attorney, Agent, or Firm* — Alston & Bird LLP

(57) ABSTRACT

In a dynamic memory allocator, a method of allocating memory to a process, the method comprising executing on a processor the steps of: creating one or more arenas within the memory, each arena comprising one or more memory blocks and each arena having an n-byte aligned arena address; upon receiving a memory request from the process, returning a pointer to the process, the pointer having as its value an address of a memory block selected from one of the arenas; upon determining that the memory block is no longer needed by the process, retrieving the address of said memory block from the pointer and releasing the memory block; and, upon a new arena being created, shifting forward the n-byte aligned address of said new arena according to a stored variable such that each memory block of said new arena is also shifted by the stored variable, the stored variable having n bytes and the stored variable having a random value.

14 Claims, 22 Drawing Sheets

(52) U.S. Cl.
CPC .... *G05B 2219/34403* (2013.01); *G06F 8/434* (2013.01); *G06F 8/443* (2013.01); *G06F 8/4434* (2013.01)

(58) Field of Classification Search
CPC ........ G06F 8/443; G06F 8/4434; G06F 12/04; G06F 12/023; G06F 2212/1024; G05B 2219/34403
See application file for complete search history.

(56) References Cited

U.S. PATENT DOCUMENTS

| | | | | |
|---|---|---|---|---|
| 2008/0016314 | A1* | 1/2008 | Li | H04L 63/1441 711/E12.091 |
| 2012/0265947 | A1* | 10/2012 | Colombo | G06F 12/0223 711/E12.001 |
| 2016/0004861 | A1 | 1/2016 | Momot | |
| 2019/0129786 | A1 | 5/2019 | Liu et al. | |
| 2020/0065012 | A1 | 2/2020 | Breslow | |
| 2020/0125501 | A1 | 8/2020 | Durham et al. | |

OTHER PUBLICATIONS

Yun et al., "*Automatic Techniques to Systematically Discover New Heap Exploitation Primitives*" Mar. 1, 2019, Georgia Institute of Technology (17 pages).

Smith, Ilya "*Heap address of pthread_create thread is aligned.*" Bug 22853 (CVE-2019-1010025) reported Feb. 16, 2018 (8 pages) [https://sourceware.org/bugzilla/show_bug.cgi?id=22853#c69%204/8].

NVD—CVE-2019-1010025 Detail, Published Jul. 15, 2019, US-CERT Security Operations Center (3 pages), [https://nvd.nist.gov/vuln/detail/CVE-2019-1010025].

* cited by examiner

```
0x7fffffff000  <--- Initial ASLR
0x00ffffff000  <--- Fixed bits
AND     0x3fffffff  <--- ~(ARENA_SIZE-1)

0x00rrrr0000000  <--- Resulting ASLR
```

| Object | Absolute entropy | Weakest correlation | Range | Zone |
|---|---|---|---|---|
| Main stack | 30.0 | 21.5 (VDSO) | 16.0 Gb | A |
| Glibc | 28.0 | 15.0 (Thr malloc) | 1024.0 Gb | C |
| Mmap | 28.0 | 15.0 (Thr malloc) | 1024.0 Gb | C |
| Exec | 28.0 | - | 1024.0 Gb | B |
| Main malloc | 28.0 | - | 1024.0 Gb | B |
| Arguments | 22.0 | 21.4 (VDSO) | 16.0 Gb | A |
| VDSO | 21.4 | - | 16.0 Gb | A |
| Thread malloc | 14.0 | - | 1023.9 Gb | C |

| Object | Abs. entropy | Weakest correlation | Range | Zone |
|---|---|---|---|---|
| Main stack | 30.0 | 21.5 VDSO | 16.0 Gb | A |
| Glibc | 28.0 | 19.0 (Thr malloc) | 1023.9 Gb | C |
| Mmap | 28.0 | 19.0 (Thr malloc) | 1023.9 Gb | C |
| Exec | 28.0 | - | 1023.9 Gb | B |
| Arguments | 22.0 | 21.4 (VDSO) | 16.0 Gb | A |
| VDSO | 21.4 | - | 16.0 Gb | A |
| Main malloc | 19.0 | - | 1023.9 Gb | C |
| Thread malloc | 19.0 | - | 1023.9 Gb | C |

| Object | Abs. entropy | Weakest correlation | Range | Zone |
|---|---|---|---|---|
| Main stack | 30.0 | 21.5 VDSO | 16.0 Gb | A |
| Glibc | 28.0 | | 1024 Gb | C |
| Mmap | 28.0 | | 1024 Gb | C |
| Exec | 28.0 | - | 1023.8 Gb | B |
| Arguments | 22.0 | 21.4 (VDSO) | 16.0 Gb | A |
| VDSO | 21.4 | - | 16.0 Gb | A |
| Main malloc | 20.0 | - | 4 Tb | D |
| Thread malloc | 20.0 | | 4 Tb | D |

| Object | Abs. entropy | Weakest correlation | Range | Zone |
|---|---|---|---|---|
| Main stack | 19.0 | 11.3 (Arguments) | 8.0 Mb | A |
| Main malloc | 13.0 | - | 32.9 Mb | B |
| Arguments | 11.0 | - | 8.0 Mb | A |
| VDSO | 8.0 | - | 1020.0 kb | D |
| Glibc | 8.0 | - | 1020.0 kb | D |
| Mmap | 8.0 | - | 1020.0 kb | D |
| EXEC | 8.0 | - | 1020.0 kb | - |
| Thread malloc | 0.0 | - | 1.0 Mb | D |

Figure 5 (Prior art)

| System | Mmap | Thread malloc |
|---|---|---|
| Intel x86_64 | 28 | 14 |
| Intel i386 | 8 | 0 |
| Intel x32 | 8 | 0 |
| ARM (32) | 8 | 0 |
| AARCH64 | 18 | 4 |
| PowerPC64EL | 14 | 4 |
| IBM s390x (64) | 11 | 4 |
| IBM s390x (32) | 11 | 3 |

Figure 6 (Prior art)

```
diff --git a/arena.c b/arena.c
index 37183cf..7c88a7a 100644
--- a/arena.c
+++ b/arena.c
@@ -122,10 +122,15 @@ int __malloc_initialized = -1;
     ptr = arena_get2 ((size), NULL);
   } while (0)

+/* find the heap and corresponding arena for a given ptr */
+
+/* find the heap and corresponding arena for a given ptr. Note that
+ * heap_info is not HEAP_MAX_SIZE aligned any more. But a random
+ * offset from the expected alignment, known by the process. This way
+ * it is fast to get the head of the area and be ASLR friendly.
+ */
 static unsigned long __arena_rnd;
 #define heap_for_ptr(ptr) \
- ((heap_info *) ((unsigned long) (ptr) & ~(HEAP_MAX_SIZE - 1)))
+ ((heap_info *) ((((unsigned long) ptr)-__arena_rnd) & ~(HEAP_MAX_SIZE - 1)) \
+  +__arena_rnd)
 #define arena_for_chunk(ptr) \
   (chunk_main_arena (ptr) ? &main_arena : heap_for_ptr (ptr)->ar_ptr)
```

Figure 10A

```
-293,6 +296,11 ptmalloc_init (void)

__malloc_initialized = 0;

+   size_t pagesize = GLRO (dl_pagesize);
+   /* Get the entropy from the already existing ASLR. */
+   arena_rnd = ((unsigned long)&_arena_rnd) & (HEAP_MAX_SIZE-1) &
+               ~(pagesize-1);
+
#ifdef SHARED
    /* In case this libc copy is in a non-default namespace, never use brk.
       Likewise if dlopened from statically linked program. */
-489,6 +499,11 new_heap (size_t size, size_t top_pad)
    {
        p2 = (char *) (((unsigned long) p1 + (HEAP_MAX_SIZE - 1))
                       & ~(HEAP_MAX_SIZE - 1));
```

```
/* The heap_info is at a random offset from the alignment to
   HEAP_MAX_SIZE. */
p2 = (char *) ((unsigned long) p2 | ___arena_rnd);
if (p1 + HEAP_MAX_SIZE <= p2)
    p2 -= HEAP_MAX_SIZE;
ul = p2 - p1;
if (ul)
    __munmap (p1, ul);
-499,12 +514,12 new_heap (size_t size, size_t top_pad)
else
{
    /* Try to take the chance that an allocation of only HEAP_MAX_SIZE
       is already aligned. */
    is already aligned to ___arena_rnd. */
    p2 = (char *) MMAP (0, HEAP_MAX_SIZE, PROT_NONE, MAP_NORESERVE);
    if (p2 == MAP_FAILED)
        return 0;
    if ((unsigned long) p2 & (HEAP_MAX_SIZE - 1))
    if (((unsigned long) p2 & (HEAP_MAX_SIZE - 1)) != ___arena_rnd)
    {
        __munmap (p2, HEAP_MAX_SIZE);
        return 0;
```

| Object | Abs. entropy | Weakest correlation | Range | Zone |
|---|---|---|---|---|
| Main stack | 29.9 | 21.4 (VDSO) | 16.0 Gb | A |
| Exec | 28.0 | - | 1023.9 Gb | B |
| Main malloc | 28.0 | - | 1023.9 Gb | B |
| Glibc | 28.0 | - | 1023.9 Gb | C |
| Mmap | 28.0 | - | 1023.9 Gb | C |
| Thread malloc | 28.0 | - | 1023.9 Gb | C |
| Arguments | 22.0 | 21.3 (VDSO) | 16.0 Gb | A |
| VDSO | 21.3 | - | 16.0 Gb | A |

1200 figure 12

| Object | Abs. entropy | Weakest correlation | Range | Zone |
|---|---|---|---|---|
| Main stack | 19.0 | 11.3 (Arguments) | 8.0 Mb | A |
| Main malloc | 13.0 | - | 32.9 Mb | B |
| Arguments | 11.0 | - | 8.0 Mb | A |
| VDSO | 8.0 | - | 1020.0 kb | D |
| Glibc | 8.0 | - | 1020.0 kb | D |
| Mmap | 8.0 | - | 1020.0 kb | D |
| EXEC | 8.0 | - | 1020.0 kb | - |
| Thread malloc | 8.0 | - | 1020.0 kb | D |

1300 figure 13

DYNAMIC MEMORY ALLOCATION METHODS AND SYSTEMS

CROSS REFERENCE TO RELATED APPLICATIONS

The disclosure claims priority to and the benefit of U.S. Provisional Patent Application No. 63/107,745, filed on Oct. 30, 2020; the entire contents of which as are hereby incorporated by reference herein in their entirety.

BACKGROUND

Related Field

The present disclosure relates to memory allocation methods and systems and in particular to dynamic memory allocation methods and systems.

Related Art

Dynamic memory allocation has been one of the first computer science issues to be addressed, and it is still an open and active field of research.

The memory managed by a dynamic allocator is generally referred to as a "heap memory" or simply "heap" for short.

Allocators are configured to deal with memory requests from programs or applications. Each instance of a program as it is being executed is generally referred to as a process; which may be executed by one or many threads. Whenever a process/program needs some memory, this is allocated by an allocator.

When an allocator receives an allocation request from a program, it locates a block of unused memory from the heap and returns a pointer to the program. At any given time, some parts of the heap are in use and others are free (or unused) and thus available for future allocations.

When the first allocators were developed, the heap was a single area of memory contiguous to the executable. All the allocation requests were attended by the allocator by borrowing memory chunks from this area of memory. However, in modern systems, by using functionalities such as the mmap( ) function it is possible to request memory chunks from additional alternative heaps, hereinafter also referred to as arenas.

This is useful for example when the allocator needs to increase the amount of memory but the default heap cannot be incremented; or, to increase the performance in a threaded application by using multiple independent heaps for the different threads.

The requirements and constraints for an allocator have changed and evolved over time to adapt to evolving hardware features and application requirements.

One of the main requirements of an allocator is that it should provide efficient memory usage. Generally, an allocator should ensure that the ratio between the amount of memory allocated to the application and the memory used by the allocator to attend application requests is as close to one as possible.

An allocator should also be fast. Memory allocation and deallocation are basic operations that can be used many times by an application, especially in applications programmed with object-oriented languages. Some allocators are designed to minimize the worst-case response time rather than the mean response time; however, it would be desirable to provide an allocator which ensures a short mean response time.

In the past it was believed that memory efficiency and fast response were inversely correlated, that is, a fast allocator would be inefficient, and contrarily, an efficient allocator would need a complex and slow algorithm. This was mostly due to fragmentation-related issues. The term "fragmentation" typically refers to how the available pool of memory gets degraded due to the unordered sequence of allocation and deallocations. After a certain number of allocations and deallocations, the heap may end up being broken into a large set of small free blocks, which are too small to fit most allocation requests, thereby causing "wasted memory", that is, memory that can no longer be allocated to an application. There are generally three main sources of fragmentation: external fragmentation, due to scattered small blocks generated by multiple subsequent allocations and deallocations; internal fragmentation, due to an allocator allocating blocks larger than needed to satisfy the application requests (e.g. to roundup the size to some predefined values); and fragmentation due to memory space taken up by metadata which are needed by the allocator to manage different pools of memory (bitmaps, linked list pointer, sizes, etc.).

The problem of designing fast and efficient allocators was partly solved by using segregated lists to manage free blocks. This has been demonstrated to reduce fragmentation (both internal and external) with an acceptable metadata footprint. However segregated lists do not have high concurrency and do not work well with multiple arenas or multiple threads.

Allocators should also achieve high concurrency. The memory of modern computer systems is generally a single shared resource accessed by multiple process or threads. Allocators must keep track of the blocks allocated and freed by each thread using global data structures. Therefore, modern allocators must also be thread aware; that is, they must provide access to these structures in a thread- and multiprocessor-aware manner to avoid contention. Allocators which are thread-safe and multiprocessor aware generally rely on creating a separate arena, (a pool of memory which can also contain the supporting metadata), for each thread. Using multiple arenas greatly reduces the contention because although any block can be used and accessed by any thread (the process has a single memory space for all threads), the same thread that allocates one block is the one that releases it.

Allocators must also provide high security against external attackers. When considering security aspects, the heap is one of the most dangerous and exploited source of vulnerabilities. Attackers have developed a large number of techniques to abuse both the metadata used by the allocators as well as the way the memory is allocated. According to Microsoft, heap vulnerabilities accounted for 53% of security problems in their products in 2017.

There has been a large range of heap specific weaknesses which have been exploited by attackers over the years, such as: CWE-122 (Heap-based Buffer Overflow), CWE416 (Use After Free), CWE-415 (Double Free), CWE-244 (Heap Inspection), etc. There is a large list of attacking techniques, generally known under fancy names, such as House of Lore, Fast Bin Dup, House of Spirit, House of Einherjar, to mention just a few. Various exploitation techniques targeting the heap will be known to the person skilled in the art. A complete taxonomy of the exploitation techniques is described by Insu Yun in his paper "Automatic techniques to systematically discover new heap exploitation primitives" (2019).

Such security weaknesses are even more severe on IoT devices, because of the limited computational and memory resources available to the process which are run on these devices.

One possible solution to address security issues of memory allocators, consists in including in the allocator multiple asserts to detect as soon as possible metadata inconsistencies. Another widely used strategy is to place guards, in the form of page guards or canary guards, to protect both metadata abuse as well as user data overflows. Some of the presently available allocators perform a large number of sanity checks on every operation requested. For example, some allocators check both the data provided by the user (e.g. the pointer to be released or the size requested) and also the internal integrity of the metadata. Unfortunately, each of these checks adds a small overhead time to each operation. When allocation and deallocation is performed in the execution path of performance critical routines, even a small overhead can have a significant impact on the application performance, hence these solutions are not ideal.

Besides direct detection and/or protection of memory corruption, one solution that has been found to work well for heap security purposes is Address Space Layout Randomization (ASLR). Knowing the actual locations, or addresses, of critical parts of the vulnerable application is necessary for an attacker to be able to successfully exploit most memory errors.

By randomizing the addresses at which objects are stored in the memory, an exploit is no longer guaranteed to work. The larger the range of random addresses, the less likely an attack is to succeed. By randomly assigning the location of the memory blocks, ASLR helps preventing an attacker, or at least make it harder for them, to identify locations where key information is stored. ASLR decreases the probability of attackers successfully exploiting memory errors.

A correct implementation of ASLR requires the coordination of multiple subsystems: processor, operating system kernel, libraries and compiler.

It is possible to differentiate two main forms of randomization: operating system-implemented ASLR and library-implemented ASLR. When ASLR is implemented by the operating system, the addresses returned by functions such as mmap( ) or brk( ) are already randomized. In this case, ASLR is a passive security technique. ASLR actions are only carried out when the operating system kernel loads the executable in virtual memory. The kernel selects several random locations to load the stack, the libraries and the executable. Once the process has been loaded no additional actions are needed. The second way to implement ASLR is at the library level.

Some secure allocators further increase the randomization provided by the ASLR, by also randomizing the blocks returned to the application so that the relative positions (offsets) between blocks are not predictable.

Unfortunately, most state of the art allocators, such as PTMALLOC, JEMALLOC and MIMALLOC, have an important security drawback since they adopt a variety of alignment policies, that is, they align metadata and in general addresses of memory blocks to large powers of two in order to speed up deallocation procedures. This approach is known as "pool alignment" and has a negative impact on the amount of randomization of the ASLR.

The problem is not caused by the intention to align the blocks returned to the application to a given value, like word size, cache line size or even page size, which in most cases is recommended by processor designers and implemented by compilers. The problem is caused by the allocator using the value of the addresses returned to the application to store information about where the metadata is located. This strategy or trick is used for example in the widely adopted allocators PTMALLOC, JEMALLOC and more recently by MIMALLOC. This metadata alignment impacts the security of a wide range of systems.

Some solutions have been proposed to address the above security issue. One of the first proposed solutions was an allocator called DIEHARDER, which consists of two main features: a bitmap-based, fully-randomized memory allocator and a replicated execution framework. The DIEHARDER allocator randomizes the placement of allocated objects as well as the length of time before freed objects are recycled. That is, memory blocks are reused by the DIEHARDER allocator at random times with respect to when they are released.

Another attempt at obviating the above security issue was proposed by Daehee Jang, who proposed a byte-granularity randomization for heap objects, which removes any form of word or cache alignment. Unfortunately, there are several compatibility and performance issues that make this approach not suitable for most applications.

GUARDER is another allocator that implements almost all security features of existing secure allocators: big bag of pages (reserve ranges or bags of contiguous memory to allocate blocks of the same size, similar to the Linux kernel slab allocator), fully-segregated metadata, guard pages, randomized allocation, over-provisional allocation, check canaries on free. SLIMGUARD, which was proposed by Beichen Liu, is yet another solution based on design principles similar to GUARDER but which aims to reduce memory consumption via a number of expedients: randomizing memory allocations with a significant entropy; over provisioning assigned memory to provide probabilistic protection against buffer overflows; segregating metadata from data in order to protect against metadata corruption-based attacks; protecting from heap over- and under-flows with the use of heap canaries; using unmapped guard pages to prevent heap buffer overflows and over-reads; implementing delayed randomized memory reuse; and, optionally, destroying data on freeing.

However, all the above solutions suffer from different drawbacks. Some are not compatible with prior existing allocators, some are affected by long overheads and/or complex metadata which increase memory consumption and impact the speed of the allocator.

It would be desirable to provide a dynamic memory allocation methods and systems which allow to find the associated arena of a given block in a fast and space efficient way whilst preserving the randomization of the arenas' base addresses and providing full compatibility with existing allocators. In particular it would be desirable to provide a dynamic memory allocation method and system which provides minimal temporal impact; no additional memory space overhead; full backward compatibility; minimal code modifications and full restoration of entropy in prior art and future allocators using address space layout randomization.

BRIEF SUMMARY

It is an object of the present disclosure to one or more of the limitations of the prior art. In particular, it is an object of the present disclosure to provide dynamic memory allocation methods and systems capable of achieving full ASLR randomization, without adding any significant overhead or structure, without imposing any restriction on allocator's alignment policies, and whilst providing full backwards compatibility with prior art allocators, high speed and low complexity.

According to a first aspect of the present disclosure there is provided, in a dynamic memory allocator, a method of allocating memory to a process, the method comprising executing on a processor the steps of: creating one or more arenas within the memory, each arena comprising one or more memory blocks and each arena having an n-byte aligned arena address; upon receiving a memory request from the process, returning a pointer to the process, the pointer having as its value an address of a memory block selected from one of the arenas; upon determining that the memory block is no longer needed by the process, retrieving the address of said memory block from the pointer and releasing the memory block; and upon a new arena being created, shifting forward the n-byte aligned address of said new arena according to a stored variable such that each memory block of said new arena is also shifted by the stored variable, the stored variable having n bytes and the stored variable having a random value.

Optionally, retrieving the address of the allocated memory block from the pointer comprises: shifting backwards the pointer by the stored variable; masking the shifted pointer with a mask corresponding to the arena size; and shifting forward the masked pointer by the stored variable.

Optionally, shifting forward the pointer by the stored variable is performed via one of: a logical OR between the pointer and the stored variable; or an arithmetic addition between the pointer and the stored variable.

Optionally, each arena has a predetermined size ARENA_SIZE and masking a pointer comprises performing a logical AND operation between the pointer and a mask given by ~(ARENA_SIZE−1).

Optionally, the stored variable is a global variable.

Optionally, the method comprises upon the dynamic memory allocator being initialized, initializing the stored variable with the random value.

Optionally, initializing the stored variable comprises requesting a random value from a kernel of the processor on which the steps are executed.

Optionally, initializing the stored variable comprises assigning to the stored variable a value equal to the address of the stored variable.

Optionally, shifting backwards a pointer or address comprises performing an arithmetic addition; and shifting forward a pointer or address comprises performing an arithmetic subtraction.

Optionally, the allocator is configured to perform address space layout randomization.

Optionally, the allocator is one of PTMALLOC, JMALLOC or MIMALLOC.

Optionally, n is a power of two.

According to a second aspect of the present disclosure there is provided a dynamic memory allocator system for allocating memory to a process, wherein the system comprises a processor and a memory, the processor being configured to: create one or more arenas within the memory, each arena comprising one or more memory blocks and each arena having an n-byte aligned arena address; upon receiving a memory request from the process, returning a pointer to the process, the pointer having as its value an address of a memory block selected from one of the arenas; upon determining that the memory block is no longer needed by the process, retrieving the address of said memory block from the pointer and releasing the memory block; and, upon a new arena being created, shifting forward the n-byte aligned address of said new arena according to a stored variable such that each memory block of said new arena is also shifted by the stored variable, the stored variable having n bytes and the stored variable having a random value.

The system of the second aspect may also incorporate using or providing features of the first aspect and various other steps as disclosed herein.

According to a third aspect of the present disclosure there is provided a non-transitory computer-readable storage medium for allocating memory to a process, comprising instructions stored thereon, that when executed by one or more processors, perform the steps of: creating one or more arenas within the memory, each arena comprising one or more memory blocks and each arena having an n-byte aligned arena address; upon receiving a memory request from the process, returning a pointer to the process, the pointer having as its value an address of a memory block selected from one of the arenas; upon determining that the memory block is no longer needed by the process, retrieving the address of said memory block from the pointer and releasing the memory block; and, upon a new arena being created, shifting forward the n-byte aligned address of said new arena according to a stored variable such that each memory block of said new arena is also shifted by the stored variable, the stored variable having n bytes and the stored variable having a random value.

The storage medium of the third aspect may also incorporate using or providing features of the first or second aspect and various other steps as disclosed herein.

BRIEF DESCRIPTION OF THE DRAWINGS

The disclosure is described in further detail below by way of example and with reference to the accompanying drawings in which:

FIG. 3 is a table illustrating the amount of entropy provided by the Linux x86_64 kernel which is lost in the JEMALLOC allocator due to the alignment of arenas;

FIG. 4 is a table illustrating the amount of entropy provided by the Linux x86_64 kernel which is lost in the MIMALLOC allocator due to the alignment of arenas;

FIG. 5 is a table illustrating the amount of entropy provided by a Linux I386 kernel which is lost in the PTMALLOC allocator due to the alignment of arenas;

FIG. 6 is a table illustrating the values of the expected entropy assuming the arena is obtained via an mmap( ) call versus the values of the actual observed entropy of thread malloc cause by the alignment in PTMALLOC when run on different Linux systems;

FIG. 10A illustrates the first portion of an example patch code for implementing the method of FIG. 9 in the allocators of the glibc library; FIG. 10B illustrate the second portion of the patch code of FIG. 10A; FIG. 10C illustrates the third portion of the patch code of FIG. 10A;

FIG. 12 is a table illustrating the entropy of different memory objects evaluated using the ASLRA tool on a Linux x86_64 system implementing the method of FIG. 9;

FIG. 13 is a table illustrating the entropy of different memory objects evaluated using the ASLRA tool on a Linux i386 system implementing the method of FIG. 9;

DETAILED DESCRIPTION OF VARIOUS EMBODIMENTS

Figure 1:
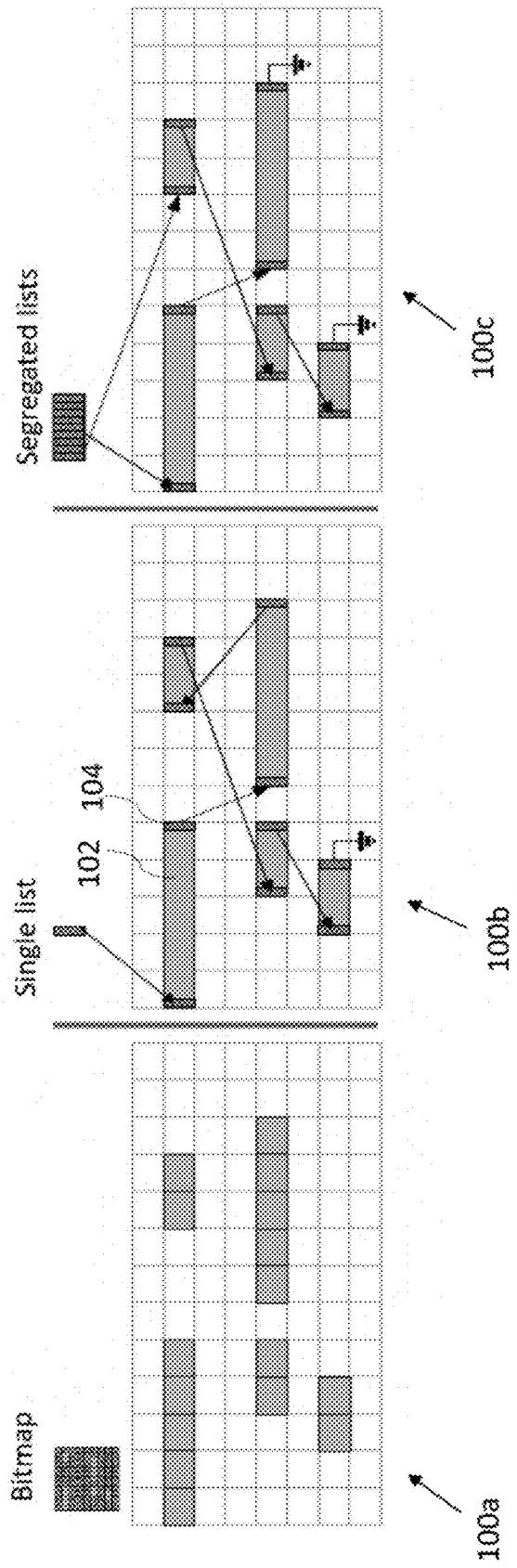
FIG. 1 is a schematic diagram illustrating different types of metadata structures used by different allocators.

The present disclosure relates to new dynamic allocation systems and methods for assigning the base address of an arena in dynamic memory allocation and for recovering the address of said arena from a pointer to a memory block which belongs to said arena.

As is known to the person skilled in the art, a byte is a unit of digital information or digital memory. A word is the smallest unit that can be addressed on the digital memory and may comprise one or more bytes.

In the present disclosure, a memory block refers to a memory unit comprising one or more words; a page refers to a collection of one or more memory blocks; and an arena refers to a collection of one or more pages.

It will be appreciated by the person skilled in the art that although the modern de facto standard is for a byte to comprise 8-bits, the present disclosure applies to bytes comprising any number of bits.

In the present disclosure, the term "allocator" refers to systems configured to handle requests for allocation and deallocation of memory from a process. An "allocation method" refers to any computer-implemented method which when executed on a processor, performs steps configured to handle requests for allocation and deallocation of memory from a process.

It will be appreciated that the term computer herein refers to any computing device, capable of executing instructions via a processor, such as but not limited to a laptop, desktop, tablet, smartphone, and so on.

Allocators generally operate on memory blocks. The workings of allocators is well known to the person skilled in the art. When an allocator receives an allocation request from a process, it locates a block of unused memory from an arena and it returns a pointer to the process.

The whole memory managed by a dynamic memory allocator is generally referred to as "heap".

As previously explained, in the first computer systems, the heap was configured to be a single area of memory contiguous to the executable. For example, in the first Unix systems, the heap was the area of memory delimited by the end of the process data segment1 (the .bss section) and the address returned by the sbrk(0) system call function. All the memory requests received by an allocator were attended by the allocator by borrowing memory chunks from this area of memory.

However, it has long possible to increase the memory area provided by the heap. For example, in Unix systems the base was given by the value returned by the first call to the sbrk(0) syscall. The heap area accessible by the allocator could be increased by calling sbrk(increment) function, which increases the upper bound of the memory area by an increment equal to a multiple of a byte.

Hence, in modern computer systems, the heap typically comprises one main arena and one or more additional, or "mmapped", arenas. For example, in Unix systems it is possible to invoke the sbrk( ) function to allocate the main arena and the mmap( ) function to request additional memory areas to the operating system. The memory returned by the mmap( ) function may be sourced from alternative arenas which are located anywhere in the virtual memory space assigned to the process.

The term heap is commonly used with a variety of different meanings. The heap may denote the totality of the memory managed by an allocator; it may denote the "default" region of memory (default arena) which is available to the allocator prior to additional arenas being created; or it may be used interchangeably with arena to indicate any region of memory.

In the foregoing disclosure it will be obvious to the person skilled in the art which of the above interpretations is appropriate based on context. In particular, it will be obvious that the plural form "heaps" is equivalent to "arenas"; whilst references to the heap and further arenas should obviously be interpreted as the default heap and the additional arenas.

The memory address at which an arena starts is commonly referred to as the "base address" of the arena or simply as the "address of the arena" or "arena address".

In systems where ASLR is enabled, the base of the heap is not contiguous to the executable but it is located at a random offset.

In Unix systems, the creation of new arenas is enabled by the function mmap( ).

Other systems have similar functions.

The mmap( ) function is generally used by allocators for three different purposes. Firstly mmap( ) can be used to increment the amount of memory. In case the default heap can not be incremented, it is possible to use multiple separated heaps, or arenas, using multiple mmaps. Secondly, mmap( ) can be used to improve performance. In a threaded application, the contention to a single heap can be mitigated by using multiple independent heaps, one for each thread. Thirdly, mmap( ) can be used to attend large malloc( )

requests. It is usually better to directly request a large block of memory from the OS, than manage the request at the same level than small blocks. Dynamic memory allocators are mainly designed to handle many small and medium size blocks of memory and although they can also attend to large block requests, it is better to use other means, such as requesting large blocks of memory directly from the OS. A mmap( ) or equivalent function is often provided by the operating system for that purpose. This way the fragmentation problem is moved from a single heap to the whole virtual memory space of the process and since the virtual space is much larger, then the fragmentation is much less problematic. The mmap( ) function is limited in that it relies on the underlying CPU paging of the virtual memory, and it forces to manage memory in blocks aligned to the page size. The size of the pages is processor dependent, but it is typically 4 or 8 KB. As a result, internal fragmentation can become very large, especially when the sizes of the memory blocks requested by the process are small.

Dynamic allocators need metadata in order to manage the arenas and the memory blocks in each arena. For example, the allocator needs to know the location and size of each block and which arena they belong to in order to allocate the blocks and in order to deallocated them, that is, release them once the process which requested it no longer needs them. Hence metadata are required to store information related to e.g. where each block starts and where it ends.

When a process or thread of a process needs to allocate memory, the allocator determines which memory area belongs to the calling thread and performs a search for a free block. This is a fast operation. Releasing a block that is no longer needed, on the other side, may be a less straightforward operation because the memory allocator needs to find the arena to which the block belongs to in order to deallocate the memory block.

The complexity of an allocator is mainly caused by the management of the free blocks. What mostly differentiate allocators is the way they manage data structures (or metadata) and algorithms used for this purpose, that is, for the management of free blocks.

Some allocators place the metadata close to (before and/or after) the blocks returned to the application, while others use a completely separate data structure. But most allocators use a combination of local information (such as the size and some pointers) and global data structures.

FIG. 1 is a schematic diagram illustrating different types of metadata structures 100a, 100b and 100c used by different allocators. Metadata are denoted by a striped pattern (102) and allocated memory blocks are shown in solid grey (104). For example, in one approach referred to as "single list" (100b), metadata are stored before and after each allocated memory block to which they relate.

In general, when multiple arenas are used, each arena has its own local metadata structure so that each one can be used both independently and in parallel to other arenas. Several threads can simultaneously use their own arenas without using a single global block. On systems with non-uniform memory access (NUMA), local arenas are also used to improve performance by assigning physical RAM from the local memory node, with a much lower access time.

Allocating memory to a thread is a fairly straightforward operation. When a thread or process requests to allocate a memory block, the allocator determines the arena that belongs to the calling thread, then locks the arena, performs the search for a block, extracts the block, and finally, unlocks the arena.

In order to be able to relocate the thread's arena, most allocators store a pointer to the arena in the thread specific data, or use a function, such as C's function call pthread_getspecific( ) or pthread_self( ), to feed a hash function.

On the other side releasing or freeing memory may not be that straightforward. The allocator needs to find the arena to which the block to be released belongs to. In most allocators, such as PTMALLOC, this is achieved by an allocator function referred to as "free" function, which only receives the pointer to the block to be released as argument. From said pointer, the free function must identify the arena to which the block belongs, that is, the free function must identify the metadata associated to the block to be released. Notably, thread specific data can not be used to locate the arena because the thread that causes the release of the block may not be the same as the one that requested its allocation, (a scenario which often occurs when the application uses a producer-consumer model).

The working of the free function to free memory allocated by an allocator can be illustrated with reference to the PTMALLOC metadata.

PTMALLOC stores in the word before each allocated memory block the size of the memory block. That is, every allocated block has a block header containing its size. For performance reasons, when PTMALLOC receives a requests for a memory allocation by a process, it aligns the value of the pointer returned to the process (i.e. the address of the allocated block) to a multiple of the word size, which is typically 4, 8 or 16 bytes. Moreover, PTMALLOC, rounds up the size requested by the process to a minimum size (again, typically 4, 8 or 16 bytes) to avoid atomizing the memory, which in turn would cause fragmentation.

Since the size is always rounded up to a minimum size, the lower bits of the size value are always zero. Therefore, some allocators, such as PTMALLOC, use these lower bits (e.g. three bits, if sizes are rounded up to 8 bytes) to store metadata flags.

In PTMALLOC, one of those flags is called NON_MAIN_ARENA. The documentation on the code explains the purpose of this flag: "The A (NON_MAIN_ARENA) bit is cleared for chunks on the initial, main arena, described by the main_arena variable. When additional threads are spawned, each thread receives its own arena (up to a configurable limit, after which arenas are reused for multiple threads), and the chunks in these arenas have the A bit set. To find the arena for a chunk on such a nonmain arena, heap_for_ptr performs a bit mask operation and indirection through the ar_ptr member of the perheap header heap_info (see arena.c)."

This way it is straightforward to determine whether a given memory block belongs to the main arena or not. But if the memory block is not in the main arena, then the allocator must determine to what arena the block belongs to.

In principle there are different methods to determine this. One solution would be to add a pointer in the block header to the arena metadata on each allocated block [Hoard]. This way, each allocated block will have at least two words in its header, the size of the block and the pointer to the arena to which the block belongs. This is fast, but increases the amount of metadata, and therefore, the amount of wasted memory.

Another solution would be to use a single global structure, such as an Adelson-Velsky and Landis (AVL) tree, to perform a fast search using the address as the search key. This method is much slower because, firstly, it requires to lock the global search structure (e.g. the AVL tree) to prevent race conditions; secondly, even the most efficient search algorithm will require a few compares and moves instructions and will impact efficiency; thirdly, access to the external search structure reduces memory locality.

In PTMALLOC a much more efficient solution can be adopted, since the blocks are aligned to a pre-determined number of bytes. Due to the block being aligned, it is possible to calculate the address of the arena from the pointer of the memory block. In particular, PTMALLOC uses a function called heap_for_ptr in order to obtain the address of the arena to which the block belongs. This function is a bitmask (logical AND) operation. This is the fastest and more space efficient of the three alternatives.

Other allocators, such as JEMALLOC, and MIMALLOC, work in a similar way to PTMALLOC. It will be appreciated that each allocator may use its own naming convention to refer to the various functions which have been discussed.

In the context of certain allocators, block are also commonly referred to as chunks. In JEMALLOC all the memory that is requested from the kernel via sbrk(2) or mmap(2) is managed in multiples of the "chunk" size, such that the base addresses of the chunks are always multiples of the chunk size. This chunk alignment of chunks allows constant-time calculation of the chunk that is associated with an allocation. Each chunk belongs to an arena, and observing those associations is critical to the correct function of the allocator. The chunk size is 2 MB by default.

In MIMALLOC pages and their metadata are allocated in an arena (generally referred to as segment in the MIMALLOC implementation) mostly to reduce expensive allocation calls to the underlying operative system. But there is another important reason for allocating metadata in a segment. When freeing a pointer, you must be able to find the page meta data belonging to that pointer. The way this is done in MIMALLOC is to align the segments to a 4 MB boundary. Finding the segment holding a pointer p can then be done by masking the lower bits as in the following code, where type casting is removed for clarity and wherein the default value of MI_SEGMENT_SIZE is 64 Mb:

: mi_segment_t*_mi_ptr_segment(void*p){return p & ~(MI_SEGMENT_SIZE−1);}

In PTMALLOC allocated arenas, or heaps, are always aligned to a large power-of-two address. Thus, when a memory block belongs to an allocated arena, or heap (i.e., the A of the memory block is set), the address of the heap_info for that heap can be computed based on the address of the memory block, as previously explained.

In particular, in PTMALLOC the heap (arena) calculation, that is, the operation to retrieve the arena to which a block belongs given the pointer to the block, is implemented as:

define heap_for_ptr(ptr) (ptr & ~(HEAP_MAX_SIZE−1))

where the default value of HEAP_MAX_SIZE is 64 MB for 64 bit processors and 512 MB for 32 bit ones.

An exception is the memory area. PTMALLOC uses the area returned by sbrk( ) for the main thread. This first area is not aligned and it is handled as a special case.

The design choices of the above allocators, which employ aligned arenas, impact the randomization and so the security of the applications. The impact of the alignment is twofold: firstly, it causes the direct reduction of the randomization of the dynamic objects, and, secondly, it causes a side effect on the entropy of the rest of the memory objects of the process.

The alignment is a configurable parameter which mainly depends on the word size of the architecture. For example, in Linux x86_64 arenas are aligned to 64 MB, which is also the size of each arena (generally set by a variable called ARENA_SIZE, or called HEAP_MAX_SIZE in PTMALLOC terminology). This way it is possible to obtain the address of an arena by resetting (that is, setting to zero) the lower 26 bits of any address. Since the size of each arena is constant, the only operation required at runtime in order to retrieve an arena address is a logical AND operation.

When a new arena is created (e.g. by using the function new_heap( ) in glibc sources, or file malloc/arena.c) the allocator requests to the operating system a mmap of memory twice the size of the alignment, then discards the an upper and lower parts such that the arena address which is a multiple of 64 MB boundary and such that the size of the arena is 64 MB. As a result, the lower 26 bits of the arena address are not randomized. The Linux kernel randomizes 28 bits of the mmap( ) space (from bit 13 to bit 40), resulting in an effective entropy of just 14 bits.

Figures 2A, 2B:
FIG. 2A is an example illustrating the workings of ASLR in PTMALLOC on Linux x86_64.
FIG. 2B is a table illustrating the amount of entropy provided by the Linux x86_64 kernel which is lost in the PTMALLOC allocator due to the alignment of arenas addresses.

FIG. 2A is an example illustrating the working of ASLR in PTMALLOC on Linux x86_64, wherein r represents random nibbles, and p partial random nibbles.

FIG. 2B is a table illustrating the amount of entropy provided by the Linux x86_64 kernel which is lost in the PTMALLOC allocator due to the alignment of arenas addresses. The absolute entropy of the Thread malloc (in bold) is 14 bits while the Main malloc is 28 bits.

Besides the reduction in entropy, the alignment or arenas in allocators such as PTMALLOC causes an additional problem: thread mallocs are correlated with the rest of mmapped memory objects. Hence, once an attacker knows the address of one of the objects, such as the address of a thread malloc, they can then design a much faster brute force attack to obtain the other addresses. Since the random bits of the thread malloc is only 14 bits (bits 27 to 40), once they are known, the remaining 14 bits (bits 13 to 26) can be guessed on their own to obtain the addresses of all the libraries. This may require up to 16384 trials to identify the address of a thread malloc and another 16384 trials to identify the address of another library which results in a total of 32768 trials.

Prior art solutions to avoid this entailed not aligning the arenas (preserving the ASLR entropy) and using an AVL tree to find the corresponding arena, but they were not successful since most developers tend to be very conservative and only accept security patches if the overhead is very small (almost negligible) and the security issue is important. If the problem is not a direct threat and the solution causes some overhead, then the solution is unlikely to be accepted by the developer community.

Other allocators, like Ottomalloc, do not align arenas in order to preserve the randomization already provided by the operating system. Instead, they use a hash table to find metadata. Yet other allocators, like supermalloc, align the arenas to 2 MB, and use a sparse array (relaying on the large virtual memory space of 64 bit processors) to make the search linear. However, these approaches have a negative impact on the efficiency of memory usage and the speed of the allocator.

FIG. 3 is a table illustrating the amount of entropy provided by the Linux x86_64 kernel which is lost in the JEMALLOC allocator due to the alignment of arenas. JEMALLOC applies alignment to smaller values, which causes less impact on the randomization. On the other hand, all mallocs in JEMALLOC (when requested by the main thread or a child thread) are affected.

FIG. 4 is a table illustrating the amount of entropy provided by the Linux x86_64 kernel which is lost in the MIMALLOC allocator due to the alignment of arenas. MIMALLOC does not rely on ASLR provided by the kernel but maps the heaps, or arenas, on addresses randomized by itself. Therefore, the mallocs are on a different zone (zone D) and there is no statistical correlation with the mmap zones. Also, the algorithm compensates for the alignment of the arenas by randomizing more bits of the addresses (a range of 4 TB, rather than 1024 GB). However, all mallocs are affected by the alignment.

FIG. 5 is a table illustrating the amount of entropy provided by a LinuxI386 kernel which is lost in the PTMALLOC allocator due to the alignment of arenas. Due to the reduced virtual space on 32 bits systems, the impact of alignment is much higher on Linux I386 as compared to Linx x86_64. Linux i386 ASLR entropy is only provided by 8 bits (the bits from 13 to 20). In PTMALLOC, although the configured alignment is only 1 MB (the lower 20 bits are zeroed), the effective ASLR entropy is zero. In JEMALLOC although block sizes are fully randomized (8 bits), 1 MB blocks have only 2.7 bits of entropy.

FIG. 6 is a table illustrating the values of the expected entropy assuming the arena is obtained via an mmap( ) call versus the values of the actual observed entropy of thread malloc cause by the alignment in PTMALLOC when run on different Linux systems. Ideally, the values in columns 602 and 604 of table 600 should be the same.

This table also illustrates that there is a significant divergence between the entropy of mmap objects across different systems. This entropy is not caused by the choice of allocator algorithm but by the Linux kernel.

The inventors of the present disclosure have devised dynamic memory allocation methods and systems which allow to find the arena associated to a given memory block in a fast and space efficient way whilst providing randomization to restore full ASLR entropy; backwards compatibility with existing allocators; minimal temporal impact; no additional memory space overhead; and easiness of implementation.

Figure 7:
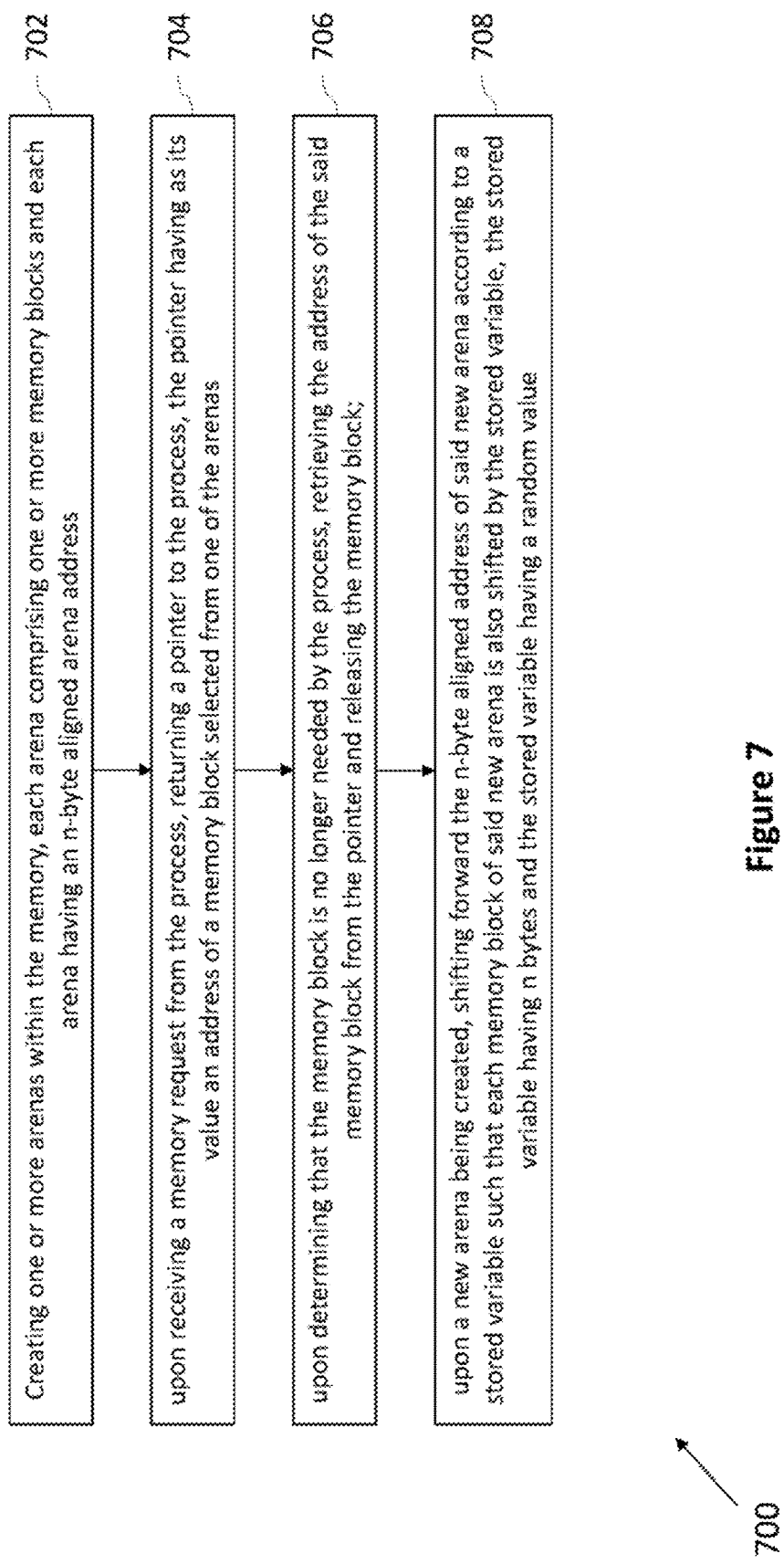
FIG. 7 is a schematic diagram of a method for allocating memory to a process in a dynamic memory allocator, according to a first aspect of the present disclosure.

FIG. 7 is a schematic diagram of a method 700 for allocating memory to a process according to a first aspect of the present disclosure. The method 700 comprises: in a dynamic memory allocator, at step 702, creating one or more arenas within the memory, each arena comprising one or more memory blocks and each arena having an n-byte aligned arena address; at step 704, upon receiving a memory request from the process, returning a pointer to the process, the pointer having as its value an address of a memory block selected from one of the arenas; at step 706 upon determining that the memory block is no longer needed by the process, retrieving the address of the said memory block from the pointer and releasing the memory block; at step 708, upon a new arena being created, shifting forward the n-byte aligned address of said new arena according to a stored variable such that each memory block of said new arena is also shifted by the stored variable, the stored variable having n bytes and the stored variable having a random value.

The number of byte n which is used for the alignment may be a predetermined number which depends on the dynamic memory allocator in which the methods and systems of the present disclosure are implemented. In certain exemplary or preferred embodiments, the methods of the present disclosure comprise n-being a power of 2, such that some steps of said method can be implemented by simple and fast logical operations.

The stored variable is assigned a random variable, such that the addresses of the arenas are shifted to a random location in the memory.

It will be appreciated that the method 700 may be implemented in any sort of allocator, including allocators which do not implement ASLR. However, the method 700 is particularly beneficial when implemented in dynamic memory allocators which use ASLR, since the random value which is assigned to the stored variable allows to re-instore the entropy that is erased by ASLR.

The skilled person will appreciate that it is possible to assign a random value to the stored variable in many ways. In dynamic memory allocators which implement ASLR, an efficient way of generating the random value is by using the ASLR's own entropy. That is, the entropy present in any memory address prior to alignment may be used. For example, in some embodiments, the address of the global variable arena_rnd may be used, that is: get_rnd( )=&arena_rnd." However, many other ways of generating the random value for the stored variable may also be used. Some further examples are discussed below.

Figure 8:
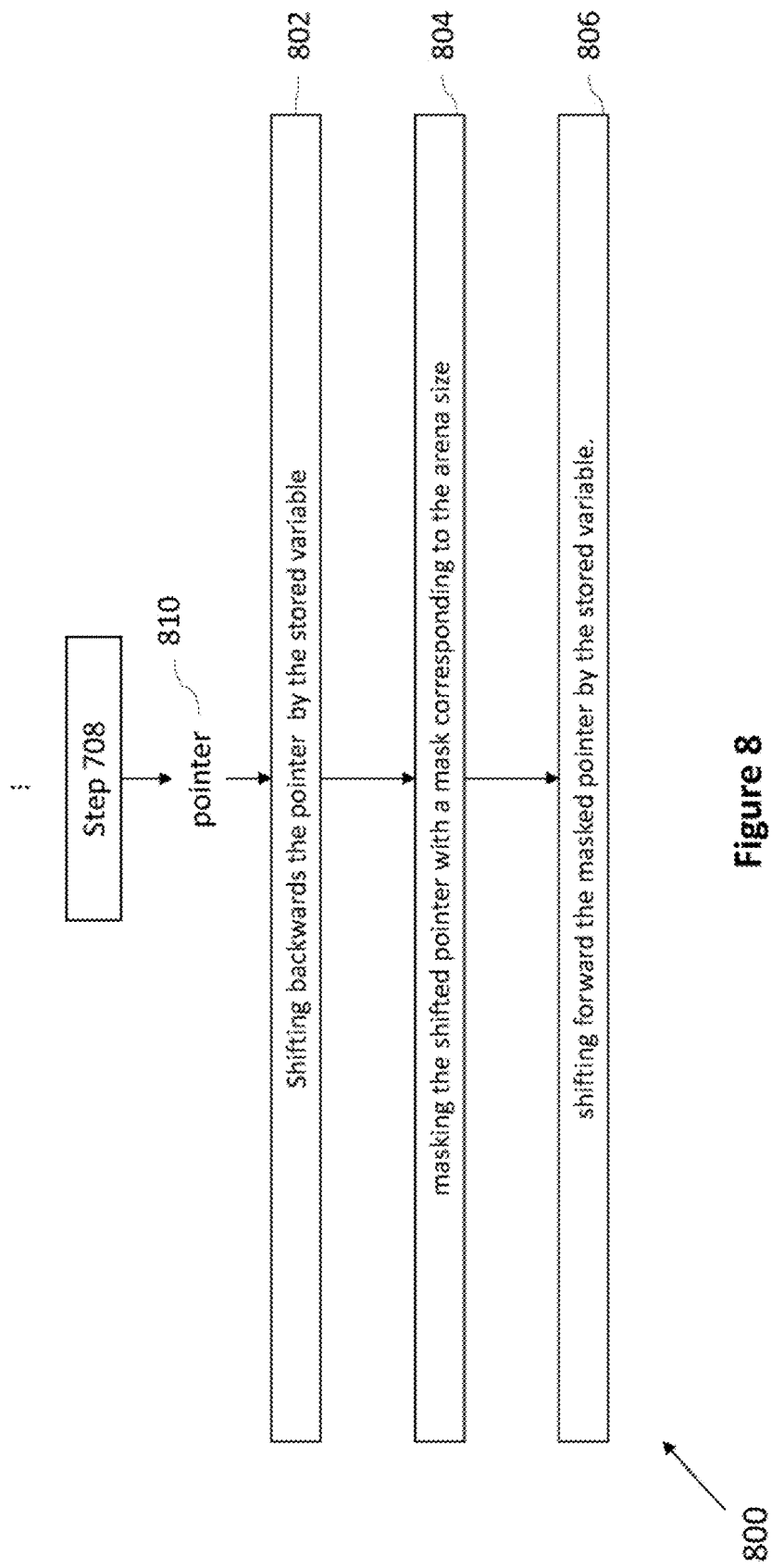
FIG. 8 is a schematic diagram of a method according to an embodiment of the present disclosure, wherein the method of FIG. 7 comprises further steps to deallocate a memory block.

FIG. 8 is a schematic diagram of a method 800 according to an embodiment of the method 700 where the method 700 comprises further steps 802, 804, 806 to deallocate a memory block.

The steps 802, 804, 806 provide a method for, upon determining that a memory block is no longer needed by the process, retrieving the address of the said memory block from the pointer and releasing the memory block.

Given a pointer 810 to any block to be released, or deallocated, the base address of the corresponding arena can be derived according to the additional steps shown in FIG. 8: at step 802, shifting backwards the pointer by the stored variable; at step 804, masking the shifted pointer with a mask corresponding to the arena size; at step 806, shifting forward the masked pointer by the stored variable.

Shifting forward and backwards the pointer in the steps of the method 700 and 800 may be performed by simple arithmetical additions and subtractions respectively. Shifting forward the pointer by the stored variable may also be performed via a logical OR operation between the pointer and the stored variable.

Masking the pointer at step 806 may be performed via a logical AND operation between the pointer and the mask. In certain exemplary or preferred embodiments, each arena has a predetermined size ARENA_SIZE and masking the pointer at step 806 comprises performing a logical AND operation between the pointer and a mask given by ~(ARENA_SIZE−1).

In other words, given a pointer to a memory block to be deallocated, the corresponding arena can be derived according to the following method:
1. Shifting back the pointer by the previously added random offset arena_rnd to get a pointer aligned to the original power of two. This operation may be done using a simple arithmetic subtraction;
2. Applying the arena MASK size (as it is used in the original allocator method);
3. Shifting forward the offset again to get the base address. This operation may be implemented as an addition or, better, as a faster logical OR operation because the shifted bits are zero and therefore there is no carry.

The idea is to randomize all the arenas according to the same value, that is all the arenas are aligned to a random value (preferably calculated at process start-up). The effect of randomizing the arenas is equivalent to shifting the base of the arena, and therefore all the allocated objects, by a random offset arena_rnd.

Details on how the stored variable may be initialized and assigned a random variable are provided below. In certain exemplary or preferred embodiments this operation is performed only once per process.

In particular, in certain exemplary or preferred embodiments, the stored variable which is used for shifting the arena addresses is a global variable. Said global variable is initialized at the time when the dynamic memory allocator is initialized and is assigned a random value which remains the same throughout runtime of the process.

In some embodiments, the random value to be assigned to the stored variable which is used to shift the base addresses of the arenas is set to be the address of the stored variable itself. Alternatively, the random value to be assigned to the stored variable which is used to shift the base addresses of the arenas may be generated by requesting a random value from a kernel of the processor on which the steps are executed.

As an example, the methods and systems according to the present disclosure will now be discussed with references to a specific dynamic memory allocator, the PTMALLOC allocator, used in the GNU Libc library.

The prior art PTMALLOC allocator aligns arenas only for the purpose of having a simple function which allows to derive the base address of the arena from a given pointer. However, if the arena base can be derived from the pointer using another method, then the arena can be at any address. That is, it is not necessary for the arena base address to be aligned. The base address of the arenas can be randomized at will, as far as the PTMALLOC function heap_for_ptr( ) for deriving the base address from the pointer returns the correct value. Therefore, the method of the present disclosure can easily be implemented in the PTMALLOC allocator as follows.

During process startup, when the allocator is initialized, the global variable arena_rnd is initialized with a random value using the following expression:

arena_rnd=get_rnd( )&(ARENA_SIZE−1)&~PAGESIZE

The variable arena_rnd may have the same number of bytes as the bytes required by the arena alignment.

Every time a new arena is created, the new arena is aligned to a random address according to the already calculated global variable arena_rnd:

new_mmap=mmap(. . . );

arena_base=((new_mmap+ARENA_SIZE−1) & ~(ARENA_SIZE−1))|arena_rnd

The only additional step required for creating an arena with respect to the prior art PTMALLOC allocator is the final OR operation with the arena_rnd variable. This operation is done at most once per new arena, which typically occurs when a new thread is created, thereby ensuring fast execution.

Figure 9:
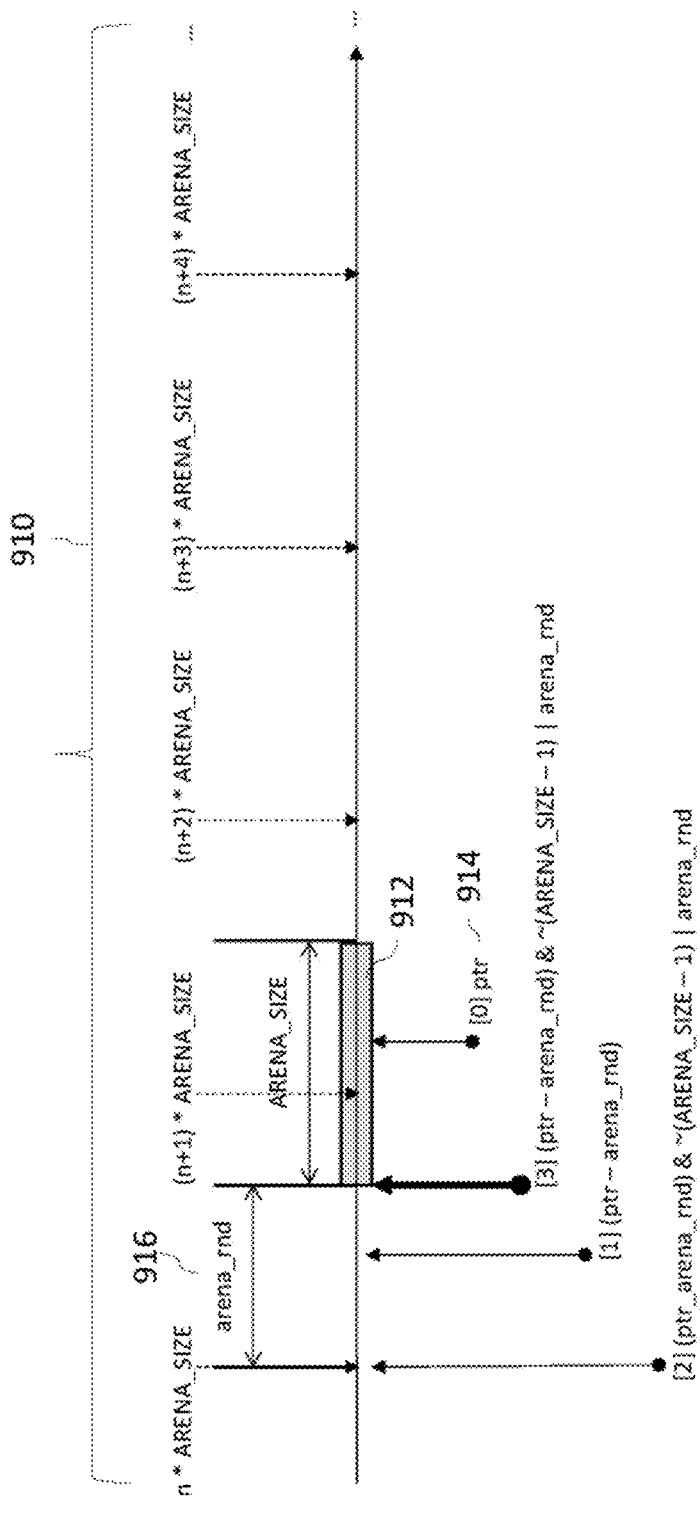
FIG. 9 is a schematic diagram of a method for retrieving the base address of the corresponding arena from a pointer to a memory block.

FIG. 9 is a schematic diagram illustrating a method for retrieving the base address of an arena 912 in PTMALLOC from a pointer 914 in accordance with the methods of FIGS. 7 and 8.

The diagram 900 illustrates a memory 910 comprising the arena 912. The base address of the arena 912 is shifted by a random value arena_rnd 916 according to the method of the present disclosure. The pointer 914 points to a memory block belonging to the arena 912.

Given the pointer ptr 914, the base address of the corresponding arena 912 can be derived according to the following steps:

[1] first, the pointer ptr 914 is shifted to undo the effect of the randomization: ptr-arena_rnd;

[2] then the pointer is masked with ~(ARENA_SIZE−1) to get an invariant value for all addresses of the arena; and

[3] lastly, the base address of the arena is retrieved by shifting the pointer according to the fixed offset from that invariant address. This may be implemented by modifying the heap_for_ptr(ptr) function of the PTMALLOC allocator as follows:

heap_for_ptr(ptr)=((ptr−arena_rnd) & ~(ARENA_SIZE−1))|arena_rnd

For comparison, the function heap_for_ptr( ) of the prior art PTMALLOC allocator is: heap_for_ptr(ptr)=ptr & ~(ARENA_SIZE−1). Hence, the method according to the present disclosure only requires an additional subtraction and a logical OR operation as compared to the prior art PTMALLOC allocator. There are no other changes to be made in the code of the allocator in order to apply the method of the present disclosure to the source code of PTMALLOC.

In order to retrieve the base address of the corresponding arena from a pointer, the pointer only needs to be shifted twice to get the arena's base. Hence the original function heap_for_ptr( ) of the prior art PTMALLOC allocator only need minimal modification in order to implement the methods of the present disclosure.

In certain exemplar or preferred embodiment, the value of the global variable arena_rnd is computed when the process is started and not changed during the process execution. This value determines the effective entropy of the $\log_2$(ARENA_SIZE) bits of arena objects.

The function get_rnd( ) may be implemented in various ways, as will be known to the person skilled in the art. The function get_rnd( ) may be a user defined function or a system function. Obtaining real entropy at user space is on itself a challenging issue. It is often not advisable to seed a PRNG algorithm with data that can be easily guessed from outside the process. When possible, it is recommended to request a random value from the kernel. For example, on Linux systems this may be done via the /dev/urandom pseudo device or using the getrandom( ) system call function.

On the other hand, reading a random value from outside the process makes the code more system and version dependent. For example, getrandom( ) was only included from glibc 2.25 and /dev/urandom may not be available on non-Linux systems. As a result, if the get_rnd( ) is implemented as suggested above, the allocator systems and methods proposed herein may not have full compatibility and portability with other existing operative systems. Additionally, implementing the get_rnd( ) function in this way would introduce some temporal overhead.

The purpose of the get_rnd( ) function is to restore the entropy of the ASLR that is erased by the alignment policies of prior art allocators. Therefore, rather than generating new entropy, the ASLR's own entropy can be exploited. That is, the entropy present in any memory address prior to alignment may be used. For example, in some embodiments, the address of the global variable arena_rnd may be used, that is: get_rnd( )=&arena_rnd.

Besides the efficiency (a single processor instruction), and the compatibility (no need to call external services), this solution has additional benefits. All methods previously proposed to calculate the random offset preserve page alignment, typically 4 KB, of the addresses returned by the mmap( ) system call function. For example, POSIX requires that the address returned by mmap( ) must be page aligned.

But the addresses returned by the allocator do not need to be aligned to any predefined value. Therefore, it is possible to randomize some of the page bits (bits 4 to 11) to increase the total number of random bits to 36. This form of randomization is called sub-page randomization. In this case, the random value for those 8 lower bits shall be obtained from the system as discussed above. The last aspect to take into account is that, in the worst case, the size of the arena is reduced by one page (4 KB out of 64 MB). Which is not a big penalty for having 8 bits more of ASLR.

An example patch code for implementing the above method in the allocators of the glibc library is shown in FIG. 10A, 10B, 10C, which illustrate a first portion 1000A, a second portion 1000B and a third portion 1000C of the patch code respectively. It will be appreciated by the skilled person that this is just one of many possible codes for implementing the methods of the present disclosures in the glibc library.

Thanks to the simplicity of the solution provided by the methods and systems of the present disclosure, the same few lines of code can be applied to GNU libc from version v2.19 the v2.32 to implement the methods and systems according to the present disclosure Only trivial syntactical changes are needed for other versions.

Figure 11A:
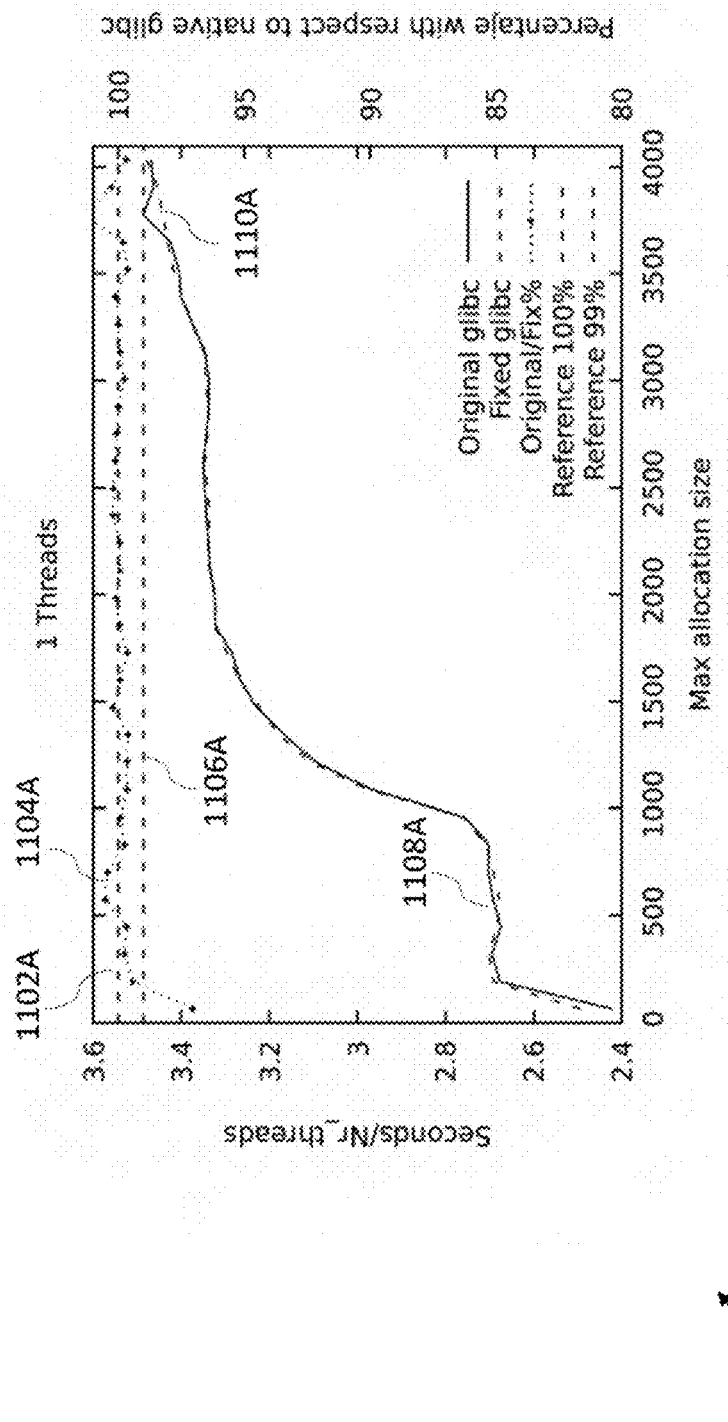
FIG. 11A is a graph showing a comparison between the performance of a prior art allocator from the glibc library and an allocator according to the present disclosure when tested with 1 thread.
Figure 11B:
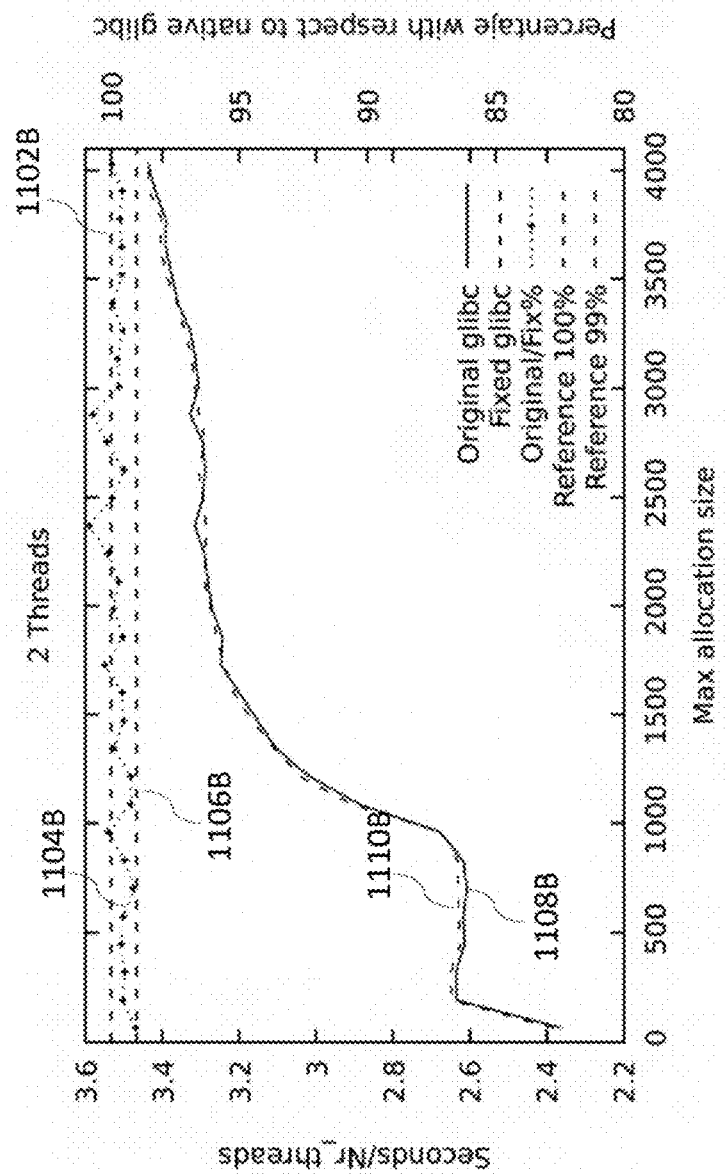
FIG. 11B is a graph showing a comparison between the performance of a prior art allocator from the glibc library and an allocator according to the present disclosure when tested with 2 threads.
Figure 11C:
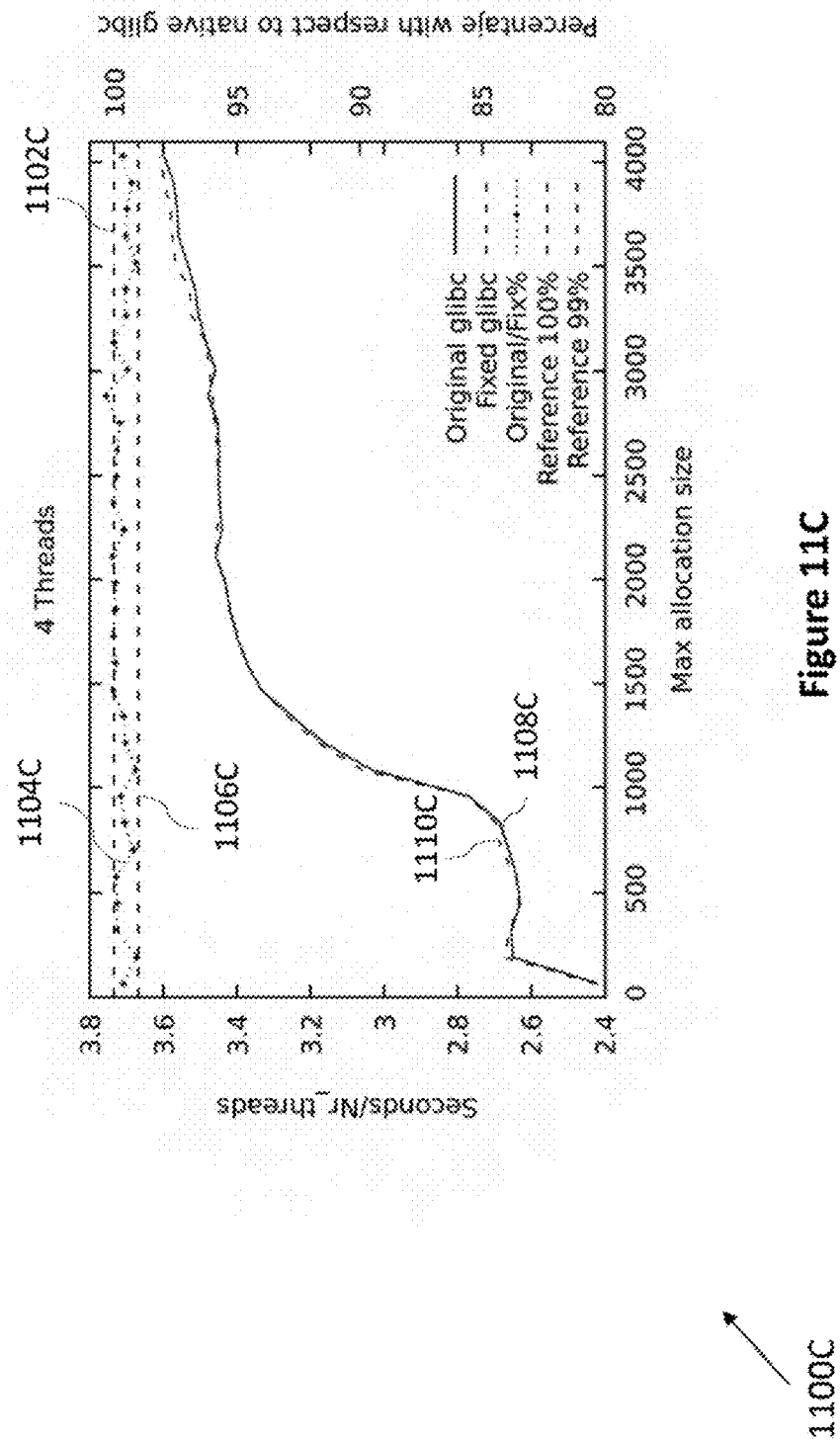
FIG. 11C is a graph showing a comparison between the performance of a prior art allocator from the glibc library and an allocator according to the present disclosure when tested with 4 threads.
Figure 11D:
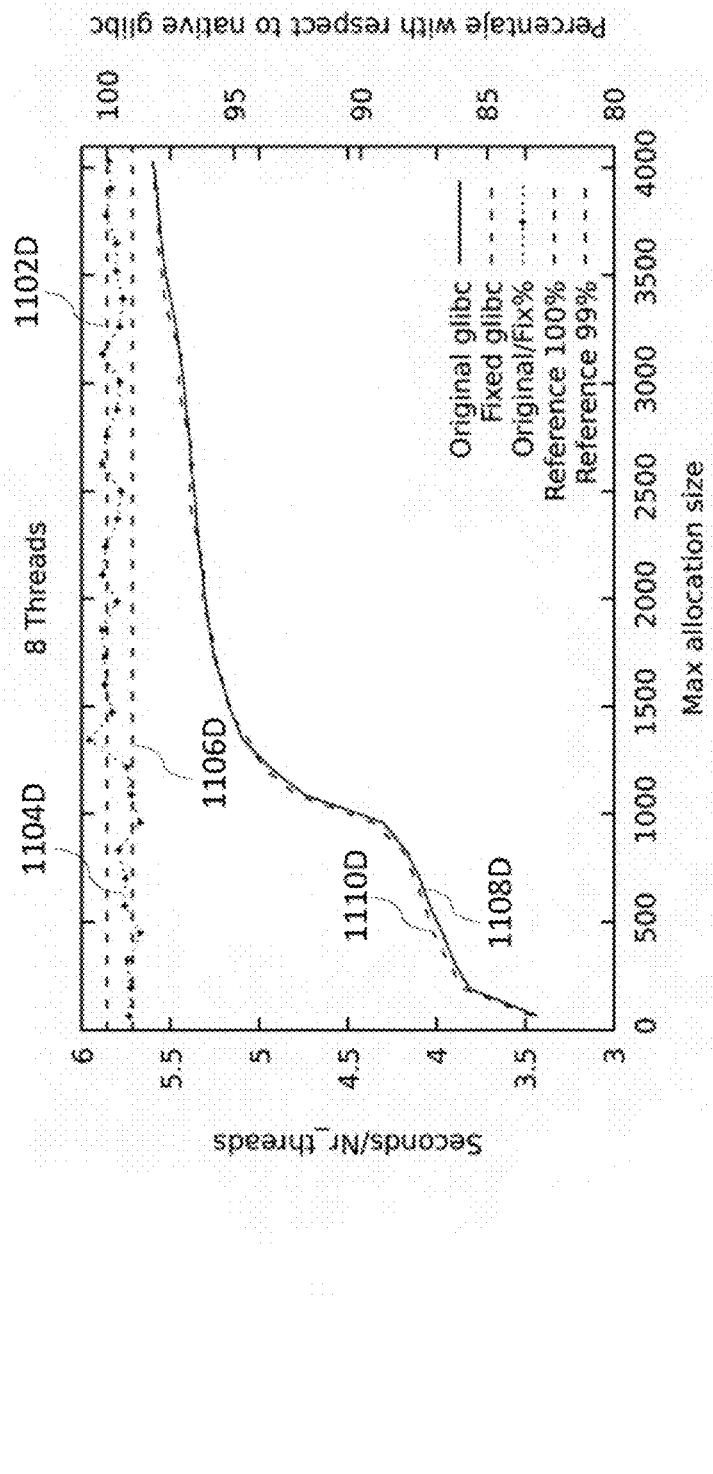
FIG. 11D is a graph showing a comparison between the performance of a prior art allocator from the glibc library and an allocator according to the present disclosure when tested with 8 threads.
Figure 11E:
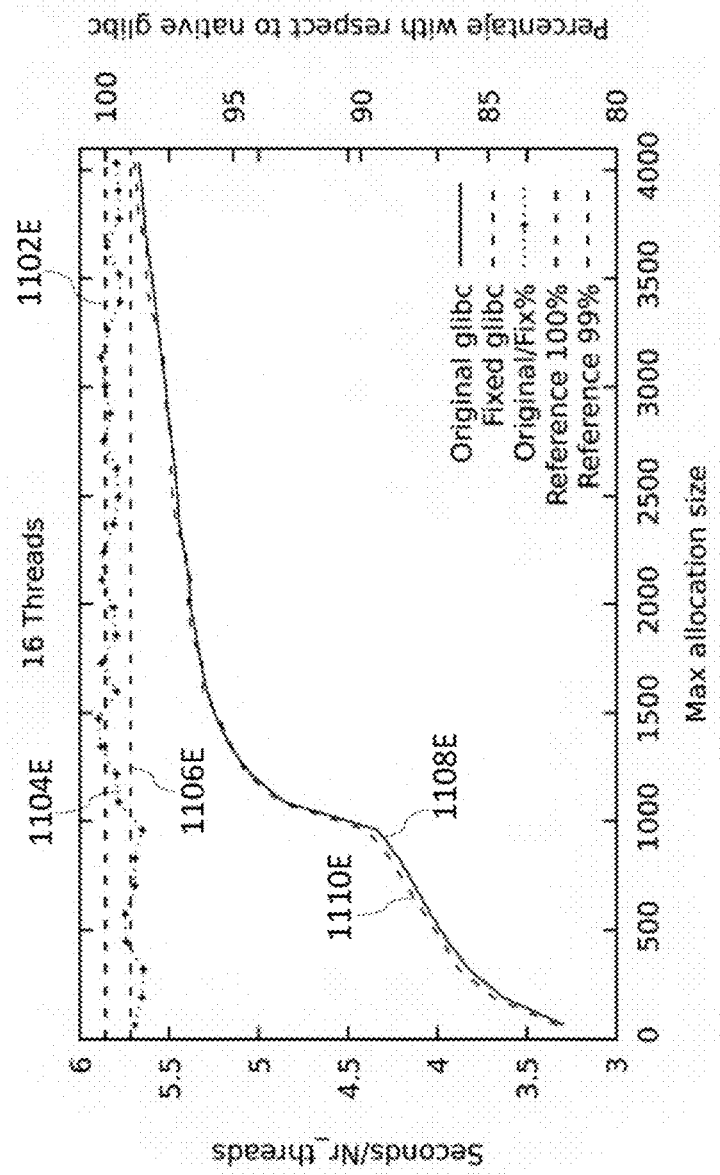
FIG. 11E is a graph showing a comparison between the performance of a prior art allocator from the glibc library and an allocator according to the present disclosure when tested with 16 threads.
Figure 11F:
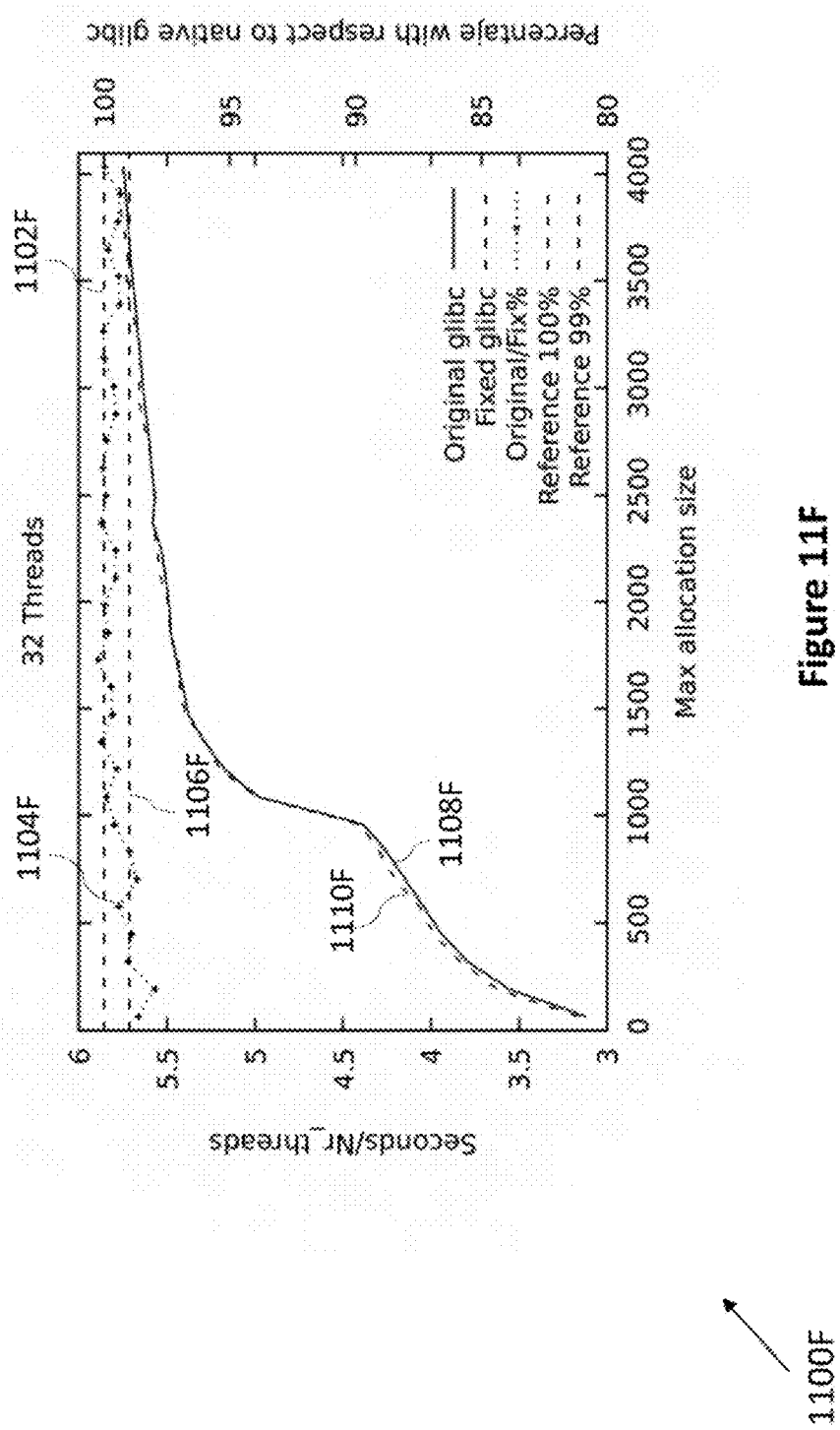
FIG. 11F is a graph showing a comparison between the performance of a prior art allocator from the glibc library and an allocator according to the present disclosure when tested with 32 thread.

FIGS. 11A through 11F show simulations illustrating the results of preliminary tests in which the methods according to the present disclosure have been successfully applied to the GNU libc v2.29 to achieve improved performance. FIGS. 11A through 11F illustrate test results showing a comparison between the performance of a prior art allocator from the glibc library and an allocator according to the present disclosure. Each Figure shows test run on said allocators using a different number of threads. FIG. 11A was run using 1 thread, FIG. 11B using 2 threads, FIG. 11C using 4 threads, FIG. 11D using 8 threads, FIG. 11E using 16 threads and FIG. 11F using 32 threads.

In each Figure, the data 1108 illustrates the performance of the prior art allocator; the data 1110 illustrates the performance of the same allocator modified according to the methods of the present disclosure; the data 1104 illustrates the ratio between 1108 and 1110; the data 1102 and 1106 indicate the 99% and 100% reference ratios respectively.

These tests were run using the synthetic benchmark included in the code of PTMALLOC and used later on in many works (tcmalloc). This test is typically referred to as "ttest1.c", which is the name of the related source file. This benchmark was developed to test the operation of all the services of the allocator, such as malloc, realloc, memalign and free, in each configured thread. The sequence of operations, and the values of the parameters are generated using a pseudorandom number generator. Threads do not communicate and do not share dynamic objects.

These tests were run on a 4 core 3.4 Ghz i7-4770 with hyper-threading enabled using glibc-2.29 on Ubuntu 19.04. The values reported are the average of 50 million operations per thread on each test. In order to run the tests, the glibc library was compiled twice: once using the original code from the debian package (libc-org.so) and a second time with the allocator implementing the methods according to the present disclosure (libc-fix.so). This way the t-test1 benchmark was run with the same framework and interferences caused by using the system library which is already loaded in memory and shared with the rest of processes were avoided.

The size of the requested memory blocks was set to 4 KB in the tests. The current version of glibc does not return freed memory to the operating system by un-mapping the pages that do not contain busy blocks. Instead, it uses the madvise( ) system call function to inform the operating system that certain pages are no longer needed. This is a much faster method because the pages are automatically populated when needed without having to mmap them back. This interesting feature introduces an undesirable overhead (call to madvise( )) when freeing blocks of memory larger than 4 KB. This overhead has a much larger as well as variable impact than the overhead caused by the method according to the present disclosure (the two instructions added).

The time, rather than the number of instructions, was measured in the tests. The time is a more appropriate value to assess the performance of the allocators because it takes into account all possible effects of the alignments, if any. As expected, the overhead introduced by the methods according to the present disclosure is less than 1%. In a few cases, the allocator implementing the methods according to the present disclosure even outperformed the native code, which may be caused by positive effects on the cache replacement algorithm or a positive feedback of threads execution. Although the benchmark code is completely deterministic (thanks to the pseudo-random generator), the heuristic and speculative nature of the current processors make it almost impossible to have reproducible timings. In conclusion, it is evident that the method according to the present disclosure does not change the temporal behavior of the glibc regardless of the workload, whilst at the same time restoring the entropy which is lost in prior art allocators due to alignment policies FIG. 12 is a table illustrating the entropy of different memory objects evaluated using the ASLRA tool on a Linux x86_64 system implementing the method of FIG. 7. FIG. 13 is a table illustrating the entropy of different memory objects evaluated using the ASLRA tool on a Linux i386_system implementing the method of FIG. 7. In both cases, the glibc 2.29 library was used.

The results in the tables 1200 and 1300 show that the entropy is the same as for the Mmap object (28 bits) and for the mallocs requested from the main process thread. The thread's mallocs are still located in the library zone (labeled as "C"), whereas the main heap is located close to the executable (zone "B").

It will be appreciated that although the above description focused on the PTMALLOC allocator, the methods and system according to the present disclosure can also be applied to the other allocators, such as, but not limited to, JEMALLOC and MIMALLOC.

Figure 14:
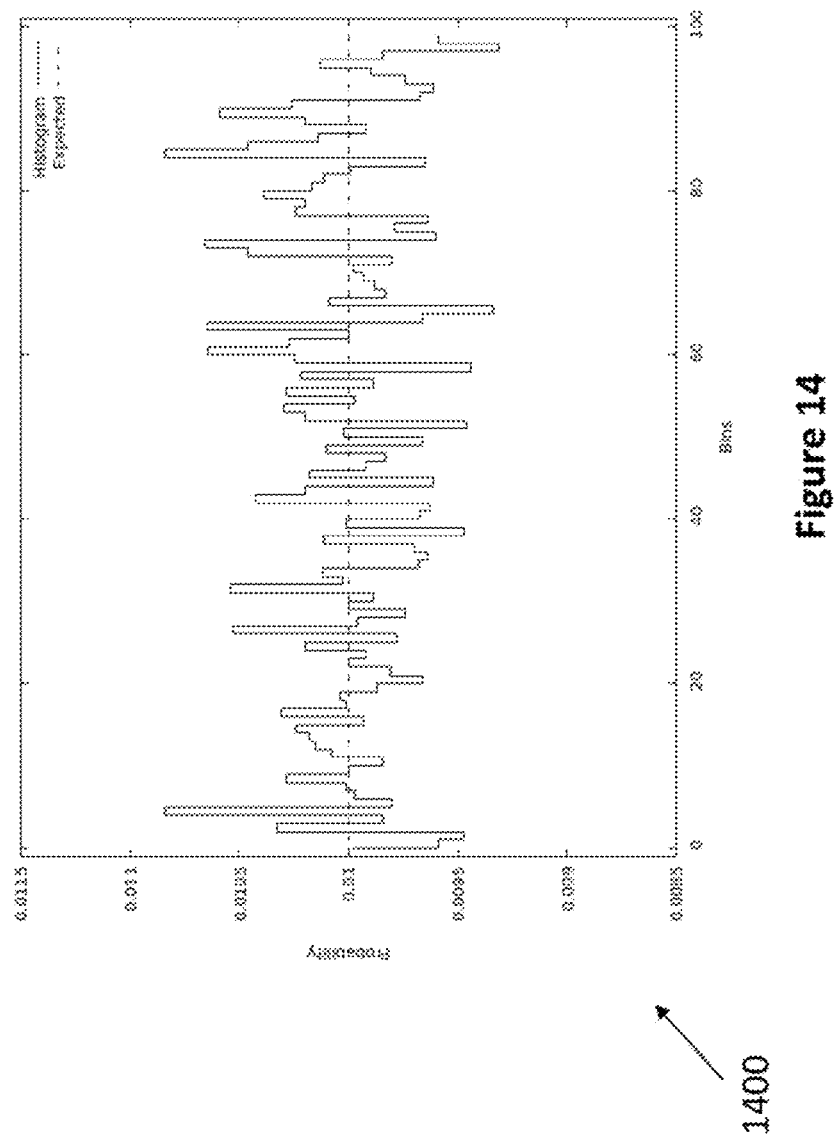
FIG. 14 is a histogram of the addresses for the thread's malloc objects of FIG. 12.

FIG. 14 is a histogram of the addresses for the thread's malloc objects of FIG. 12, from which it can be seen that the addresses have a uniform distribution.

The backward application and development compatibility of the methods and system according to the present disclosure were also analyzed. Backward application compatibility of a new solution requires that all existing applications can run unmodified (same binaries) with the new solution. Development compatibility refers to the behavior of the system and the process when the configuration of the ASLR is tuned.

For these tests, the system libc library was replaced with a "fixed" library implementing the methods according to the present disclosure by building a new distribution package; and the system was extensively tested with a graphical interface and multiple users using common application as document editors, web browsers, compiler, emulators, etc. The ASLR can be disabled on a per process basis, using the system call function personality( ) or the command setarch; or, the ASLR can be disabled at system level by writing the operation mode in /proc/-sys/kernel/randomize_va_space.

All these mechanisms were tested and the entropy of the arenas got disabled automatically as expected in all situations.

The only additional data added by the allocator methods and systems according to the present disclosure as compared with the previous PTMALLOC allocator code is one integer (unsigned long) variable to hold the random value which is used to shift the addresses. The methods and systems according to the present disclosure do not add any new data structures to each arena nor to the global allocator metadata and to the allocated or busy blocks. That is, the methods according to the present disclosure allow to preserve the memory layout of existing allocators.

The temporal overhead of the methods and system according to the present disclosure is given by the addition of two arithmetic operations each time the allocator needs to get the arena base from a pointer, which only occurs when the freeing functions, such as realloc( ) and free( ), are called.

Another aspect to be considered is ASLR management compatibility. ASLR is a feature currently enabled by default, but that can be disabled when needed. When debugging an application, it is advisable to disable it in order to have easier to reproduce scenarios. For example, the GNU DeBugger (GDB) disables it by default. The methods and system according to the present disclosure allow to automatically adjust the entropy of the arenas to the entropy of the rest of the memory objects. Therefore, if the user disables the ASLR, then the arena's ASLR are also disabled.

Due to the organization of the memory, memory alignment may have an impact on the performance of the underlying hardware management unit (MMU). With the methods and systems according to the present disclosure, since the arena size (64 BM) is not equal to the boundary of page table translation level (2 MB, 1 GB or 512 Gb on the x86_64 architecture), there is no performance penalty by not having alignment to 64 MB boundaries.

Hence, the present disclosure provides an allocator agnostic solution that restores ASLR randomization back to that originally provided by an operating system. The proposed solution can be implemented with a few lines of code and can be applied to any allocator. Moreover, the proposed solution does not alter the allocation policy or design of the allocator; therefore, the methods of the present disclosure can easily be applied to existing allocators keeping any allocator's behavior unchanged whilst providing additional entropy.

The systems and methods according to the present disclosure allow to restore the ASLR entropy to thread's heaps, therefore eliminating the security drawback of the prior art, all whilst ensuring backward compatibility and without adding any significant overhead nor any new data structure, apart from one unsigned long variable. In particular, the systems and methods according to the present disclosure use a simple mathematical function which operates at constant time and only need two additional Boolean operations to restore full entropy in ASLR without imposing any restriction on the location alignment.

It will be appreciated that in different embodiments the steps of the above methods may be executed in different order and that the stated steps do not preclude the presence or addition of one or more other steps.

Figure 15:
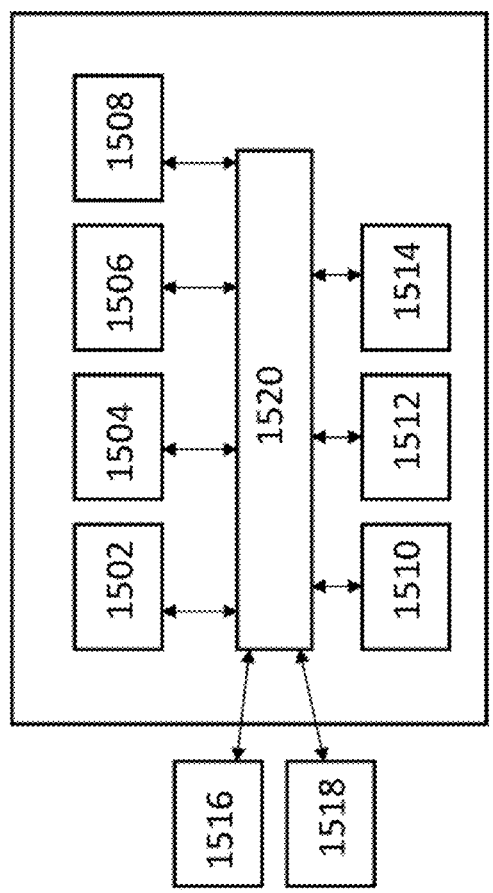
FIG. 15 is a schematic diagram of a computer system which comprises specially modified components for carrying out the methods of the present disclosure, in accordance with a second aspect of the present disclosure.

FIG. 15 is a schematic diagram of a computer system 1500 which comprises specially modified components for carrying out the methods of this disclosure, in accordance with a second aspect of the present disclosure.

The computer system 1500 comprises a module 1502 which is configured as a dynamic memory allocator configured to implement the methods of the present disclosure.

The computer system 1500 may comprise a processor 1504, a storage device 1506, RAM 1508, ROM 1510, a data interface 1512, a communications interface 1514, a display 1516, and an input device 1518. The computer system 1500 may comprise a bus 1520 to enable communication between the different components.

The computer system 1500 may be configured to load an application. The instructions provided by the application may be carried out by the processor 1504. The application may be the dynamic memory allocator.

A user may interact with the computer system 1500 using the display 1516 and the input device 1518 to instruct the computer system 1500 to implement the methods of the present disclosure in the dynamic allocation of memory to any process, program or application.

In conclusion, the methods and system according to the present disclosure reconcile the use of the alignment to implement fast algorithms whilst not jeopardizing ASLR. The solution proposed herein is fully backward compatible, it has negligible overhead (both temporal and spatial) and can be implemented in existing allocators by adding a minimal number of additional code lines.

Various improvements and modifications may be made to the above without departing from the scope of the disclosure. It will be appreciated that the principles of this disclosure may apply equally to the allocation of either virtual or physical memory, and references herein to "memory" will apply to either form, unless specifically mentioned as being applicable exclusively to one type or the other.

What is claimed is:

1. In a dynamic memory allocator, a method of allocating memory to a process, the method comprising executing on a processor the steps of:
    creating one or more arenas within the memory, each arena comprising one or more memory blocks and each arena having an n-byte aligned arena address;
    upon receiving a memory request from the process, returning a pointer to the process, the pointer having as its value an address of a memory block selected from one of the arenas;
    upon determining that the memory block is no longer needed by the process, retrieving the address of said memory block from the pointer and releasing the memory block;
    upon a new arena being created, shifting forward the n-byte aligned address of said new arena according to a stored variable such that each memory block of said new arena is also shifted by the stored variable, the stored variable having n bytes and the stored variable having a random value.

2. The method as claimed in claim 1 wherein retrieving the address of the allocated memory block from the pointer comprises:
    shifting backwards the pointer by the stored variable;
    masking the shifted pointer with a mask corresponding to an arena size;
    shifting forward the masked pointer by the stored variable.

3. The method as claimed in claim 2 wherein shifting forward the pointer by the stored variable is performed via one of:
    a logical OR between the pointer and the stored variable; or an arithmetic addition between the pointer and the stored variable.

4. The method as claimed in claim 2 wherein each arena has a predetermined size ARENA_SIZE and masking a pointer comprises performing a logical AND operation between the pointer and a mask given by ~(ARENA_SIZE-1).

5. The method as claimed in claim 1 wherein the stored variable is a global variable.

6. The method as claimed in claim 1 wherein the method comprises:
upon the dynamic memory allocator being initialized, initializing the stored variable with the random value.

7. The method as claimed in claim 6 wherein initializing the stored variable comprises requesting a random value from a kernel of the processor on which the steps are executed.

8. The method as claimed in claim 6 wherein initializing the stored variable comprises assigning to the stored variable a value equal to an address of the stored variable.

9. The method as claimed in claim 1 wherein:
shifting backwards a pointer or address comprises performing an arithmetic addition; and
shifting forward a pointer or address comprises performing an arithmetic subtraction.

10. The method as claimed in claim 1 wherein the allocator is configured to perform address space layout randomization.

11. The method as claimed in claim 1 wherein the allocator is one of PTMALLOC, JMALLOC or MIMALLOC.

12. The method as claimed in claim 1 wherein n is a power of two.

13. A dynamic memory allocator system for allocating memory to a process, wherein the system comprises a processor and a memory, the processor being configured to:
create one or more arenas within the memory, each arena comprising one or more memory blocks and each arena having an n-byte aligned arena address;
upon receiving a memory request from the process, returning a pointer to the process, the pointer having as its value an address of a memory block selected from one of the arenas;
upon determining that the memory block is no longer needed by the process, retrieving the address of said memory block from the pointer and releasing the memory block;
upon a new arena being created, shifting forward the n-byte aligned address of said new arena according to a stored variable such that each memory block of said new arena is also shifted by the stored variable, the stored variable having n bytes and the stored variable having a random value.

14. A non-transitory computer-readable storage medium for allocating memory to a process, comprising instructions stored thereon, that when executed by one or more processors, perform the steps of:
creating one or more arenas within the memory, each arena comprising one or more memory blocks and each arena having an n-byte aligned arena address;
upon receiving a memory request from the process, returning a pointer to the process, the pointer having as its value an address of a memory block selected from one of the arenas;
upon determining that the memory block is no longer needed by the process, retrieving the address of said memory block from the pointer and releasing the memory block;
upon a new arena being created, shifting forward the n-byte aligned address of said new arena according to a stored variable such that each memory block of said new arena is also shifted by the stored variable, the stored variable having n bytes and the stored variable having a random value.

* * * * *